United States Patent Office 3,389,714
Patented June 25, 1968

3,389,714
TRANSPORTATION OF LIQUIDS AND SLURRIES
Ralph C. Hughes and Richard L. Every, Ponca City, Okla., assignors to Continental Oil Company, Ponca City, Okla., a corporation of Delaware
No Drawing. Filed Nov. 18, 1965, Ser. No. 508,554
10 Claims. (Cl. 137—13)

ABSTRACT OF THE DISCLOSURE

Difficultly pumpable fluids such as viscous liquids and liquid-solid slurries are treated to reduce viscosity by dissolving therein an inert gas.

---

This invention relates to the transportation of liquids through conduits. In one aspect, the invention is directed to a method for reducing the viscosity of liquids and liquid-solid slurries in pipelines.

During winter months, pumping costs to pipeline viscous hydrocarbons rise substantially as a result of increases in the viscosity of the hydrocarbons. Also, certain slurries, such as phosphate slime-water, have a relatively high head-loss per mile in comparison to other materials. An economical method for reducing the viscosity of such materials by the use of an agent which does not contaminate the carrier fluid could effect considerable savings in seasonal power costs.

It is an object of this invention to provide an improved process for the transportation of liquids and liquid-solid slurries through conduits.

It is another object of this invention to provide an improved process for reducing power costs by reducing the viscosity of liquids and liquid-solid slurries which are transported through pipelines.

Still another object of this invention is to provide an improved process for transporting petroleum fractions and phosphate slime-water slurries through pipelines.

These and other objectives of the invention will become more readily apparent from the following detailed description and discussion.

The foregoing objectives are achieved broadly by adding to a liquid or liquid-solid slurry which is to be transported through a conduit, a fluid under sufficient pressure whereby the fluid is absorbed in the liquid or liquid-solid slurry. The temperature and pressure conditions of the slurry are such that the fluid is absorbed in the gaseous state. The effect of the absorbed fluid is to reduce the viscosity of the liquid or liquid-solid slurry whereby pressure drop through the conduit is substantially reduced.

In carrying out the invention, the fluid is added to the liquid or liquid-solid slurry which is to be transported in any suitable manner. For example, the fluid can be injected into the pipeline or into a pump or at any other suitable point under sufficient pressure whereby the desired amount of fluid is combined with and absorbed in the liquid or liquid-solid slurry. Any fluid which is immiscible with and inert to the liquid or liquid-solid slurry can be employed. Suitable fluids are the low molecular weight hydrocarbons, such as, methane, ethane, propane, ethylene, etc., and nonhydrocarbon gases, such as nitrogen, carbon dioxide, helium and other materials of a similar nature. Preferably, the fluid employed is one which has a higher vapor pressure than the liquid being transported so that the fluid can readily be separated from the carrier liquid at its terminus.

The fluid can be combined with the liquid or liquid-solid slurry in the gaseous state or as a liquid. It is necessary, however, that the fluid be present as a gas at the conditions of pressure and temperature which exist in the conduit or pipeline.

The amount of fluid which is added can vary widely and generally with increased amounts of fluid the viscosity reducing effect is increased. However, proportionally, the largest effect is realized with a relatively small amount of fluid and additional quantities of fluid do not therefore provide a commensurate reduction in viscosity.

The quantity of added fluid can be determined by the pressure of the system. For example, the amount of added fluid can be defined as that quantity which is absorbed in the liquid or liquid-solid slurry at a pressure between about 5 and about 5,000 p.s.i.g. at normal atmospheric temperature, that is, 20° C. Preferably, the quantity of fluid is that which is absorbed under normal atmospheric temperature at a pressure of between about 50 and about 200 p.s.i.g.

Very often the pressure in the conduit or pipeline is such that the transported material would be capable of absorbing more fluid than desired. In such an event, the quantity of fluid to be added can be readily determined by introducing the fluid into a sample of the transported material under appropriate temperature and pressure conditions and measuring the amount of fluid thus absorbed. This measured amount of fluid can then be metered into the transported material at a convenient location.

The liquids and liquid-solid slurries which are employed in carrying out the invention are preferably those materials which have a high viscosity, particularly at lower temperatures; however, it is within the scope of the invention to utilize any liquid or liquid-solid slurry which is capable of being reduced in viscosity by the addition of an inert immiscible fluid as defined herein.

Suitable liquids which can be transported in the method of this invention include various hydrocarbons, such as, crude oils, diesel oils, gas oils, and other petroleum fractions. Liquid slurries include such materials as phosphate slime-water, coal-crude oil, petroleum coke-diesel oil, etc.

Patricular systems which are utilized in carrying out the invention include natural gas and crude oil, ethane and gas oil, carbon dioxide and diesel fuel, natural gas and phosphate slime-water slurry, and the like.

It is important that the pressure in the conduit or pipeline is sufficient to maintain the added fluid absorbed in the liquid or liquid-solid slurry. Should the pressure be reduced below this level, flashing can occur, that is, gas can be released from the liquid to form pockets of free gas which may cause vapor lock or in other ways adversely effect the transportation of the liquid or liquid-solid slurry. Thus, if the fluid, for example, is introduced to the liquid or liquid-solid slurry in an amount which is absorbed at 150 p.s.i.g. and 20° C., it is necessary that the pressure in the conduit at this temperature always be maintained above 150 p.s.i.g. The important pressure, of course, is the pressure at the terminus of the conduit or the pipeline since this generally will be the lowest pressure existing in the system.

When the liquid or liquid-solid slurry reaches its terminus, if desired the added fluid can be separated by any conventional method, for example, in a vapor recovery system under reduced pressure, by heating to drive off the fluid, etc. The liquid and liquid-solid slurry then can be recovered in an essentially fluid-free state.

The following examples are presented in illustration of the invention.

Example I

The following tests were carried out in a CIMCO[1] rolling ball viscometer. In carrying out the tests, the viscometer was first filled with water to establish a standard roll time which was 15.35 seconds. This time was then related to the water viscosity which was 0.92 cp. No. 2 diesel oil was used in some of the tests and this material provided a roll time of 38.3 seconds which was equated to a viscosity of 2.69 cp. Various tests were then run on the water and No. 2 diesel oil with a series of gases. In each test, the roll time was established and was compared with the standard for water and No. 2 diesel oil to establish the values listed in Table I.

TABLE I.—CIMCO ROLLING BALL VISCOMETER

| Additive | | Liquid | | Vis., cp. (After addition) |
|---|---|---|---|---|
| Gas | Press., lbs. | At 75° F. | Vis., cp. (Before addition) | |
| Natural gas | 50 | Water | 0.95 | 0.80 |
| Do | 180 | do | 0.92 | 0.76 |
| Ethane | 50 | do | 0.93 | 0.80 |
| Do | 100 | do | 0.93 | 0.77 |
| Carbon dioxide | 50 | No. 2 Diesel | 2.69 | 2.11 |
| Do | 100 | do | 2.69 | 1.97 |
| Do | 200 | do | 2.69 | 1.75 |
| Natural gas | 50 | do | 2.60 | 2.41 |
| Do | 180 | do | 2.60 | 2.39 |

NOTE: Rolltime of 15.35 seconds used as 0.92 cp. for water viscosity on CIMCO. Rolltime of 38.36 seconds used as 2.69 cp. for diesel viscosity on CIMCO.
[1] Manufactured by Coleman Instrument and Manufacturing Company.

It is apparent from the data in Table I that the addition of the inert immiscible gas at relatively low pressures had a substantial effect in reducing the viscosity of the water and the No. 2 diesel oil.

The following example is presented in illustration of a commercial application of the invention.

Example II

No. 2 diesel oil is transported through a 50-mile-10-inch pipeline under a pressure of 935 pounds and atmospheric temperature at a rate of 2000 barrels per hour. The pumping costs for this operation are $262 per day. Natural gas is added to the pipeline at the pump station in an amount equivalent to maximum absorption at a pressure of 150 p.s.i.g. Upon reaching its terminus, the diesel fuel is pumped into a tank which is under atmospheric pressure whereby the natural gas is released from the diesel fuel and is vented from the tank. The addition of the natural gas reduces the viscosity of the diesel fuel and as a result the pumping costs are decreased to $248 per day.

Although this invention has been described with respect to particular embodiments thereof, it is not to be so limited, as changes and modifications may be made therein which are within the spirit and scope of the invention as defined by the appended claims.

We claim:
1. In a process in which a material selected from the group consisting of viscous liquids and liquid-solid slurries is transported through a conduit under pressure, the improvement which comprises:
   (1) absorbing in said material an essentially inert immiscible fluid which is in the gaseous state under the conditions of temperature and pressure in said conduit, said fluid having a vapor pressure greater than said material, the amount of said fluid being sufficient to reduce the apparent viscosity of said material; and
   (2) maintaining sufficient pressure in said conduit to prevent the formation of free gas.
2. The process of claim 1 in which the fluid introduced to the transported material is that amount which is absorbed at normal atmospheric temperature and at a pressure between about 5 and about 5,000 p.s.i.g.
3. The process of claim 2 in which the fluid is a hydrocarbon and the transported material comprises water.
4. The process of claim 3 in which the fluid is natural gas and the transported material is a phosphate slime-water slurry.
5. The process of claim 4 in which the fluid introduced to the transported material is that which is absorbed at normal atmospheric temperature and a pressure between about 50 and about 200 p.s.i.g.
6. The process of claim 2 in which the fluid is a low molecular weight hydrocarbon and the transported fluid comprises a highly viscous hydrocarbon fraction.
7. The process of claim 6 in which the fluid introduced to the transported material is that which is absorbed at normal atmospheric temperature and a pressure between about 50 and 200 p.s.i.g.
8. A process which comprises:
   (1) absorbing in a material selected from the group consisting of viscous liquids and liquid-solid slurries an essentially inert immiscible fluid which is in the gaseous state under the conditions of temperature and pressure in said conduit, said fluid having a vapor pressure greater than said material, the amount of said fluid being sufficient to reduce the apparent viscosity of said material;
   (2) transporting said material containing said absorbed fluid through said conduit to a terminus while maintaining sufficient pressure in said conduit to prevent the formation of free gas;
   (3) separating said fluid from said material; and
   (4) recovering said material essentially free from said fluid.
9. The process of claim 8 in which the fluid is a hydrocarbon and the transported material comprises water.
10. The process of claim 8 in which the fluid is a low molecular weight hydrocarbon and the transported fluid comprises a highly viscous hydrocarbon fraction.

References Cited
UNITED STATES PATENTS

| | | | |
|---|---|---|---|
| 1,007,788 | 11/1911 | Mills | 137—13 |
| 1,454,485 | 5/1923 | Persch | 137—13 |
| 3,136,325 | 6/1964 | Mattix | 137—3 |
| 3,269,401 | 8/1966 | Scott | 137—13 |

ALAN COHAN, Primary Examiner.